United States Patent Office 3,376,129
Patented Apr. 2, 1968

3,376,129
METHOD OF MANUFACTURE OF A HIGH-DISPERSION CARBONYL IRON
Vitaly Grigorjevich Syrkin, Ulitsa A. Tolstogo 38/2, Apt. 3, and Iosif Semenovich Tolmassky, 3rd Vladimirskaja ulitsa 3, Apt. 16, both of Moscow, U.S.S.R.; Anna Ernestovna Fridenberg, deceased, late of Moscow, U.S.S.R., by Serafima Ernestovna Fridenberg, administrator, Derbenevskaja naberezhnaja, 1/2, Apt. 49, Moscow, U.S.S.R.
No Drawing. Filed Nov. 25, 1964, Ser. No. 415,562
2 Claims. (Cl. 75—.5)

ABSTRACT OF THE DISCLOSURE

The invention consists of a process of manufacturing high-dispersion iron carbonyl powder by decomposition by heating iron pentacarbonyl in the presence of gaseous ammonia in a reactor having three superposed heating zones and maintaining temperatures in said zones of successively decreasing gradients from top to bottom, particularly in the range of 302° C. to 312° C. in the upper zone, of from 285° C. to 298° C. in the middle zone and from 275° C. to 282° C. in the bottom zone, and subsequently recovering the formed iron carbonyl powder in a filter.

The present invention relates to a method of manufacturing high-dispersion carbonyl iron, which is a valuable ferromagnetic material for the manufacture of magnetodielectric cores, said material being also employed in radio engineering and in telephone communication circuits.

There is known and practically applied a method of manufacturing high-dispersion powdered carbonyl iron by the decomposition of iron pentacarbonyl vapours in the presence of ammonia at a rising temperature gradient according to a reaction

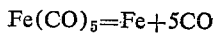

$$Fe(CO)_5 = Fe + 5CO$$

taking place in the horizontal and vertical reactors.

When operating in the horizontal reactors, a large amount of compact iron is formed, and the powder carbonyl iron is contaminated with admixtures of hard carbon.

Under the known manufacturing conditions, in vertical reactors one cannot produce high-dispersion, low-carbon powders, possessing the required electromagnetic properties. There is a necessity of additional operations, in particular those of the separation of powders and of their heat-treatment in the hydrogen current. This allows to manufacture the powder carbonyl iron of a required quality, but its yield is not higher than 2 to 3 percent by weight of the products obtained.

An object of the present invention is to manufacture high-dispersion and low-carbon powder carbonyl iron with but low values of coefficients of separate losses directly in one stage by means of heat decomposition.

A further object of the invention is to obtain comparatively high yields of the finished product in the process of manufacturing carbonyl iron.

These and other objects and advantages of the present invention will become more fully apparent from a consideration of the following detailed description of a preferred embodiment of the proposed method.

Said objects have been attained by developing a new method of the manufacture of high-dispersion powder iron, comprising heat decomposition of vapours of iron pentacarbonyl in the presence of ammonia in a reactor, said vapours passing through a succession of zones with a temperature gradient decreasing from top to bottom. The temperature of zones is maintained in the following ranges: top, 290 to 315° C., medium, 285 to 305° C., bottom, 260 to 290° C.

It has been established that the vertical distribution of temperatures in the reactor determines the size of particles of the iron powder, its chemical composition, and, consequently, electromagnetic properties. The temperature of the upper zone of the reactor drastically affects the size of the powder particles, which decreases with the rise of temperature and does not produce any tangible influence upon their chemical composition. The temperature of the lower zone practically does not influence the degree of dispersion of powders, but it does predetermine the content of both carbon and nitrogen in the powders and, hence, the value of coefficient of hysteresis losses in the Relay region ($\delta_{hr.}$). Thus, a decrease of the temperature in the lower zone of the reactor from 320 to 234° C. results in decreasing the content of carbon in the powders from 0.78 to 0.62 percent, and the value of coefficient $\delta_{hr.}$ from $0.21 \cdot 10^{-3}$ to $0.07 \cdot 10^{-3}$.

When operating with the temperature dropping from the top to the bottom of the reactor, the rate of convection of the reaction gas (a gaseous mixture, formed by the decomposition of iron pentacarbonyl) considerably decreases, which results in obtaining higher dispersion and low-carbon powders.

The method of the present invention may be preferably realized under the following temperature conditions: temperature in the upper zone of the reactor, 302 to 312° C.; in the medium zone, 285 to 298° C.; and in the lower zone, 275 to 282° C.

EXAMPLE 1

The liquid iron pentacarbonyl in the amount of 10 l. per hour is heated up to 106° C. in an evaporator; being evaporated there, vapours of iron pentacarbonyl together with the gaseous ammonia in the amount of 412 l. per hour are supplied into a heat-decomposition reactor about 4 m. high and 0.75 m. in diameter. The reactor is provided with a sectional electric heating system in such a manner as to maintain there the following distribution of temperatures: top, 303 to 305° C.; center, 285 to 290° C., and bottom, 275 to 280° C. As a result, powdered carbonyl iron is then discharged from a filter in an amount of 18 to 21 percent of the total amount of the powder produced, and as to the quality characteristics, corresponds to powders used in the telephone communication circuits (see the table).

EXAMPLE 2

The liquid iron pentacarbonyl in the amount of 39 l. per hour is heated up to 108.5° C. in an evaporator; being evaporated there, vapours of iron pentacarbonyl together with the gaseous ammonia in the amount of 1629 l. per hour are supplied into a heat-decomposition reactor about 5 m. high and 1 m. in diameter. The reactor is provided with a gas heated jacket. Entering via a control device into two inlets, the gas further flows helically over the reactor surface, being then let out first in one and then in the other connecting branch. This provides for the following distribution of temperatures: top, 308 to 311° C.; medium, 287 to 298° C.; and bottom, 278 to 282° C. As a result, in a filter there is obtained about 17 to 20 percent of the powder (figures are given in the table).

TABLE.—ELECTROMAGNETIC CHARACTERISTICS OF POWDERED CARBONYL IRON, MANUFACTURED IN TEST REACTORS

| Electromagnetical characteristics | Dimensions | Designation | Example 1 | Example 2 |
|---|---|---|---|---|
| Initial permeability | Gsoersted | $\mu_{in}$ | 11–12 | 11–13 |
| Coefficient of hysteresis losses in the Relay region* | | $\delta_{hr}.10^3$ | 0.05–0.10 | 0.1 |
| Coefficient of losses through magnetic viscosity and eddy currents (Foucault currents).* | | $\delta_{vf}.10^9$ | 0.5–1.0 | 1.0 |
| Coefficient of hysteresis losses in the initial region of magnetization.* | | $\delta_{ih}.10^3$ | 0.04–0.16 | 0.2 |
| Temperature coefficient of the initial permeability | °C.$^{-1}$ | $Tc\mu.10^6$ | From +20 to −50 | 50 |
| Relative quality of cylindrical cores at a frequency of 5 megacycles. | | $Q_{rel}$ | 2.05 | 2.0 |
| Effective permeability at a frequency of 5 megacycles. | | $\mu_{eff}$ | 3.05 | 3.00 |
| Relative quality of cylindrical cores at a frequency of 50 megacycles. | | $Q^1_{rel}$ | 0.98 | 0.95 |
| Effective permeability at a frequency of 50 megacycles. | | $\mu^1_{eff}$ | 1.70 | 1.60 |

*Coefficients of separate losses.

It should be noted that in the present invention there is developed the technology of manufacturing high-dispersion powder, low-carbon, carbonyl iron, suitable, in the first place, for telephone communication circuits due to low values of coefficients of separate losses of said powder and, in the second place, for radio-engineering purposes because of high values of the relative quality characteristics and effective magnetic permeability of said powder within a wide range of frequencies, which is well characterized by the figures, as given in the table.

Though the present invention is described in connection with its preferred embodiment, there may take place modifications and alterations without departing from the spirit and scope of the invention, which will be understood by those skilled in the art.

These modifications and alterations are understood not to depart from the idea and scope of the invention, as stated in the appended claims.

What is claimed is:

1. A method of manufacturing high-dispersion powder carbonyl iron, comprising heat decomposition of iron pentacarbonyl in the presence of gaseous ammonia in a reactor, in which plural superposed zones are created with a successively decreasing temperature gradient from top to bottom zones recovering formed powder carbonyl iron in a filter.

2. A method of manufacturing high-dispersion powder carbonyl iron, comprising heat decomposition of iron pentacarbonyl in the presence of gaseous ammonia in a reactor, maintaining successively decreasing temperature gradients from top to bottom in the zones so that in the upper zone 302 to 312° C. temperature is maintained, in the medium zone 285–298° C. temperature is maintained in the lower zone 275–282° C. temperature is maintained, and subsequently recovering formed powder carbonyl iron in a filter.

References Cited

UNITED STATES PATENTS 2,772,956  12/1956  West et al. _____ 75—56

OTHER REFERENCES

British Intelligence Objective Subcommittee Final Report No. 1575. Interrogation Report No. 590. Item No. 21, 1949, page 21.

DAVID L. RECK, *Primary Examiner.*

W. W. STALLARD, *Assistant Examiner.*